(12) United States Patent
Qiao et al.

(10) Patent No.: US 10,962,706 B2
(45) Date of Patent: Mar. 30, 2021

(54) BACKLIGHT MODULE AND DISPLAY DEVICE

(71) Applicant: BOE TECHNOLOGY GROUP CO., LTD., Beijing (CN)

(72) Inventors: Yong Qiao, Beijing (CN); Jianbo Xian, Beijing (CN); Xinyin Wu, Beijing (CN); Yongda Ma, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/496,586

(22) PCT Filed: Aug. 6, 2018

(86) PCT No.: PCT/CN2018/098924
§ 371 (c)(1),
(2) Date: Sep. 23, 2019

(87) PCT Pub. No.: WO2019/042090
PCT Pub. Date: Mar. 7, 2019

(65) Prior Publication Data
US 2020/0319396 A1 Oct. 8, 2020

(30) Foreign Application Priority Data
Aug. 31, 2017 (CN) .......................... 201721114823.2

(51) Int. Cl.
*G02B 6/00* (2006.01)
*G02F 1/13357* (2006.01)
*F21V 8/00* (2006.01)

(52) U.S. Cl.
CPC .......... *G02B 6/0088* (2013.01); *G02B 6/004* (2013.01); *G02B 6/005* (2013.01)

(58) Field of Classification Search
CPC .................. G02B 6/0088; G02B 6/005; G02F 2001/133314
See application file for complete search history.

(56) References Cited

U.S. PATENT DOCUMENTS 10,302,852 B2 * 5/2019 Kim ..................... G02B 6/0085
2006/0028836 A1 2/2006 Shin et al.
(Continued)

FOREIGN PATENT DOCUMENTS

CN 1731247 A 2/2006
CN 1987596 A 6/2007
(Continued)

OTHER PUBLICATIONS

International Search Report and Written Opinion issued in corresponding International Application No. PCT/CN2018/098924, dated Nov. 23, 2018, with English translation.

*Primary Examiner* — Karabi Guharay
(74) *Attorney, Agent, or Firm* — McDermott Will & Emery LLP

(57) ABSTRACT

A backlight module includes a back plate and a light guide plate. The light guide plate and the back plate are stacked together. The back plate includes a bottom surface and a plurality of side walls located on edges of the bottom surface; a positioning gap is formed between each two adjacent side walls of the plurality of side walls. The light guide plate includes a light guide plate body part and at least one light guide positioning portion disposed on a side surface of the light guide plate body part. The at least one light guide positioning portion is engaged with a corresponding positioning gap.

17 Claims, 7 Drawing Sheets

(56) References Cited

U.S. PATENT DOCUMENTS

| | | | |
|---|---|---|---|
| 2007/0030701 A1 | 2/2007 | Chang |
| 2007/0147092 A1 | 6/2007 | Fu et al. |
| 2013/0343087 A1 | 12/2013 | Huang |
| 2014/0176872 A1 | 6/2014 | Miyazaki |
| 2015/0260908 A1 | 9/2015 | Kiguchi |

FOREIGN PATENT DOCUMENTS

| | | |
|---|---|---|
| CN | 102650394 A | 8/2012 |
| CN | 202484901 U | 10/2012 |
| CN | 104456310 A | 3/2015 |
| CN | 104685555 A | 6/2015 |
| CN | 207366886 U | 5/2018 |
| WO | 2013143180 A1 | 10/2013 |
| WO | 2013189102 A1 | 12/2013 |

* cited by examiner

BACKLIGHT MODULE AND DISPLAY DEVICE

CROSS-REFERENCE TO RELATED APPLICATION

This application is a national phase entry under 35 USC 371 of International Patent Application No. PCT/CN2018/098924 filed on Aug. 6, 2018, which claims priority to Chinese Patent Application No. 201721114823.2, filed with the Chinese Patent Office on Aug. 31, 2017, titled "A BACKLIGHT MODULE AND DISPLAY DEVICE", which are incorporated herein by reference in their entirety.

TECHNICAL FIELD

The present disclosure relates to the field of display technologies, and in particular, to a backlight module and a display device.

BACKGROUND

With low power consumption, small radiation, and good display effect, liquid crystal display device, a kind of passive light-emitting flat panel display device, has become a mainstream product on the market.

SUMMARY

In a first aspect, the present disclosure provides a backlight module. The backlight module includes a back plate and a light guide plate. The light guide plate and the back plate are stacked together. The back plate includes a bottom surface and a plurality of side walls located on edges of the bottom surface. A positioning gap is formed between each two adjacent side walls of the plurality of side walls. The light guide plate includes a light guide plate body part and at least one light guide positioning portion disposed on a side surface of the light guide plate body part. The at least one light guide positioning portion is engaged with a corresponding positioning gap.

In some embodiments, the backlight module further includes an optical film. The optical film is located on a surface of the light guide plate away from the back plate. The optical film includes an optical film body part and at least one film positioning portion disposed on the optical film body part. The at least one film positioning portion is engaged with a corresponding positioning gap.

In some embodiments, an orthographic projection of the at least one film positioning portion on a plane of the bottom surface at least partially overlaps with an orthographic projection of a positioning gap with which the at least one film positioning portion is engaged on the plane of the bottom surface, and an orthographic projection of the at least one light guide positioning portion on the plane of the bottom surface at least partially overlaps with an orthographic projection of a positioning gap with which the at least one light guide positioning portion is engaged on the plane of the bottom surface.

In some embodiments, an outer edge line of the orthographic projection of the at least one light guide positioning portion on the plane of the bottom surface is located within the orthographic projection of the positioning gap with which the at least one light guide positioning portion is engaged on the plane of the bottom surface. An outer edge line of the orthographic projection of the at least one film positioning portion on the plane of the bottom surface is located within the orthographic projection of the positioning gap with which the at least one film positioning portion is engaged on the plane of the bottom surface.

In some embodiments, the at least one light guide positioning portion is engaged with at least one positioning gap in one-to-one correspondence, and the at least one film positioning portion is engaged with at least one positioning gap in one-to-one correspondence.

In some embodiments, a plane of each of the plurality of side walls is perpendicular to a plane of the bottom surface. The at least one light guide positioning portion and the light guide body part are located on a same plane. The optical film body part and the at least one film positioning portion are located on a same plane.

In some embodiments, at least one positioning gap includes a first direction positioning gap and a second direction positioning gap that are communicated with each other. The first direction positioning gap and the second direction positioning gap are communicated to each other. There is a positioning angle between an orthographic projection of the first direction positioning gap included in each positioning gap on a plane of the bottom surface and an orthographic projection of the second direction positioning gap included in a same positioning gap on the plane of the bottom surface. The positioning angle falls in a range of 75°-135°. One film positioning portion of the at least one film positioning portion and one light guide positioning portion of the at least one light guide positioning portion share a same positioning gap. The one light guide positioning portion is engaged with a first direction positioning gap included in the same positioning gap. The one film positioning portion is engaged with a second direction positioning gap included in the same positioning gap.

In some embodiments, at least one light guide positioning portion and at least one film positioning portion share at least one positioning gap in one-to-one correspondence.

In some embodiments, each of the at least one light guide positioning portion is a protruding light guide positioning portion, and each of the at least one film positioning portion is a protruding film positioning portion. Protruding directions of a protruding light guide positioning portion and a protruding film positioning portion that share a same positioning gap are different.

In some embodiments, each of the at least one light guide positioning portion is a protruding light guide positioning portion, and a protruding direction of each of the at least one light guide positioning portion is parallel to a plate surface of the light guide plate body part. Each of the at least one film positioning portion is a protruding film positioning portion, and a protruding direction of each of the at least one film positioning portion is parallel to the plate surface of the optical film body part. A protruding direction of a protruding light guide positioning portion that shares a same positioning gap with a protruding film positioning portion is perpendicular to a light incident surface of the light guide plate, and a protruding direction of a protruding film positioning portion that shares a same positioning gap with a protruding light guide positioning portion is parallel to the light incident surface of the light guide plate. Or, the protruding direction of the protruding light guide positioning portion that shares the same positioning gap with the protruding film positioning portion is parallel to the incident surface of the light guide plate, and the protruding direction of the protruding film positioning portion that shares the same positioning gap with the protruding light guide positioning portion is perpendicular to the incident surface of the light guide plate.

In some embodiments, a plurality of protruding light guide positioning portions are provided, and a plurality of protruding film positioning portions are provided. At least two of the plurality of protruding light guide positioning portions have different protruding directions, and at least two of the plurality of protruding film positioning portions have different protruding directions.

In some embodiments, along a circumferential direction of the side surface of the light guide plate body part, a protruding direction of each of the plurality of protruding light guide positioning portions changes clockwise, counterclockwise, or alternately. Along a circumferential direction of a side surface of the optical film body part, a protruding direction of each of the plurality of protruding film positioning portions changes clockwise, counterclockwise, or alternately.

In some embodiments, the backlight module further includes a mold frame. The mold frame includes a mold frame body and at least one inner buffer sheet. A first buffer space is provided between the side surface of the light guide plate body part and each of the plurality of side walls, and a second buffer space is provided between a side surface of the optical film body part and each of the plurality of side walls. The first buffer space is in one-to-one correspondence with each of the plurality of side walls, and the second buffer space is in one-to-one correspondence with each of the plurality of side walls. The first buffer space and the second buffer space corresponding to each of the plurality of side walls are communicated to each other and together constitute a buffer receiving region. The at least one inner buffer sheet is provided in the buffer receiving region.

In some embodiments, multiple layers of optical films are provided, and each of the multiple layers of optical films is provided with alignment mark holes. Orthographic projections of the alignment mark holes provided in each of the multiple layers of optical films on a plane of the bottom surface are independent of each other.

In some embodiments, the light guide plate is a side-type light guide plate, and the backlight module includes a light-shielding region and a light-transmitting region. Light guide plate dots located in the light-transmitting region and the light-shielding region are distributed on the light guide positioning portion. The light guide plate dots are distributed on positions of the at least one light guide positioning portion corresponding to the light-transmitting region and the light-shielding region.

In a second aspect, the present disclosure provides a display apparatus, and the display apparatus includes a display panel and the above backlight module.

In some embodiments, a mold frame in the backlight module further includes a protective cover. The protective cover is disposed on a surface of a mold frame body on which at least one inner buffer sheet is not formed, and the display panel is located in the protective cover.

In some embodiments, a thickness of the positioning gap is the same as a thickness of two adjacent side walls forming the positioning gap, and a thickness direction of the positioning gap is the same as a thickness direction of the two adjacent side walls forming the positioning gap. A height of the positioning gap is the same as a height of two adjacent side walls forming the positioning gap, and a height direction of the positioning gap is the same as a height direction of the two adjacent side walls forming the positioning gap.

In some embodiments, the height of two adjacent side walls forming the at least one positioning gap is equal to the sum of a thickness of the light guide plate and a thickness of the optical film.

In some embodiments, the mold frame further includes at least one outer buffer sheet. The at least one outer buffer sheet and the at least one inner buffer sheet are disposed on a same surface of the mold frame body. The mold frame body, each of the at least one outer buffer sheet, and a corresponding one of the at least one inner buffer sheet together form a sidewall recessed gap having a recessed port. And at least one of the plurality of side walls is inserted into at least one side wall recessed gap through the recessed port in one-to-one correspondence.

BRIEF DESCRIPTION OF THE DRAWINGS

The accompanying drawings are used to provide further understanding of the present disclosure and constitute a part of the present disclosure. The exemplary embodiments in the present disclosure and the descriptions thereof serve to explain the present disclosure, but do not constitute a limitation to the present disclosure. In the drawings.

DETAILED DESCRIPTION

Figure 1:
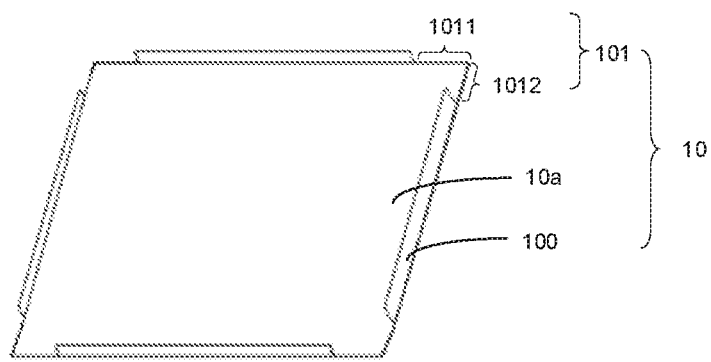
FIG. 1 is a schematic diagram showing a structure of a back plate, in accordance with some embodiments of the present disclosure.

The technical solutions in embodiments of the present disclosure will be described clearly and completely with reference to the accompanying drawings in embodiments of the present disclosure. Obviously, the described embodiments are merely some but not all of embodiments of the present disclosure. All other embodiments made on the basis of the embodiments of the present disclosure by a person of ordinary skill in the art without paying any creative effort shall be included in the protection scope of the present disclosure.

In the related art, a liquid crystal display device includes a backlight module and a display panel disposed on a light-emitting surface of the backlight module. The backlight module serves as a light source to provide light to the display panel. The display panel visualizes the light to achieve the purpose of image display. The backlight module generally includes a back plate and a light guide plate disposed on the back plate. A bottom surface of the back plate is provided with a positioning structure such as a positioning column, so as to position the light guide plate on the back plate, and to ensure that an image displayed on the display panel is stable.

Although the bottom surface of the back plate is provided with a positioning structure for ensuring stable image display on the display panel, a projection of the positioning structure on the display panel must be located at a frame region of the display panel, so that the positioning structure does not affect the image display of the display panel. Therefore, a width of the frame region of the display panel is limited by a size of the positioning structure provided on the bottom surface of the back plate, which is not conducive for reducing a frame width of the liquid crystal display device.

Referring to FIGS. 1-3, 14 and 15, a backlight module 1 provided by some embodiments of the present disclosure includes a back plate 10 and a light guide plate 11. The light guide plate 11 and the back plate 10 are stacked together. The back plate 10 includes a bottom surface 10a, and a plurality of side walls 100 located on edges of the bottom surface 10a. The plurality of side walls 100 may be located on a same edge of the bottom surface 10a or on different edges of the bottom surface 10a. A positioning gap 101 is formed between each two adjacent side walls 100 of the plurality of side walls 100. The light guide plate 11 includes a light guide plate body part 111 and at least one light guide positioning portion 110 disposed on a side surface of the light guide plate body part 111. The at least one light guide positioning portion 110 is engaged with the a corresponding positioning gap 101 in one-to-one correspondence.

Figure 2:
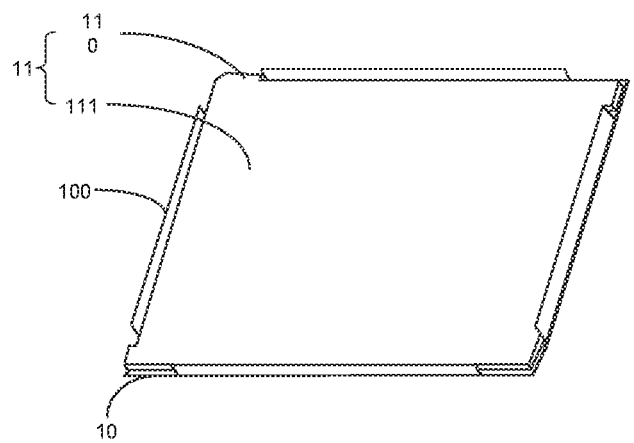
FIG. 2 is a schematic diagram showing how a back plate and a light guide plate are fitted together, in accordance with some embodiments of the present disclosure.

It will be understood that, as shown in FIG. 1, a positioning gap 101 is formed between each two side walls 100 of the plurality of side walls 100. The number of the side walls 100 may be set according to the number of the light guide positioning portion 110. As shown in FIG. 2, the light guide positioning portion 110 may be made with a same material as the light guide plate body part 111, so that in a case where the light guide plate 11 is a side-type light guide plate, light can be transmitted through the light guide plate body part 111 and the light guide positioning portion 110 that are made of the same material. Therefore, a problem of poor light guiding uniformity caused by a difference in materials of the light guide plate body part 111 and the light guide positioning portion 110 may be avoided. In addition, it is generally necessary to provide a reflective sheet (not shown in FIGS. 1 to 16) between the back plate 10 and the light guide plate 11 to reflect light that travels from the light guide plate 11 toward a direction of the back plate 10. In this way, the light reflected by the reflective sheet is redirected by the light guide plate 11, so as to achieve the purpose of making full use of the light.

Figure 16:
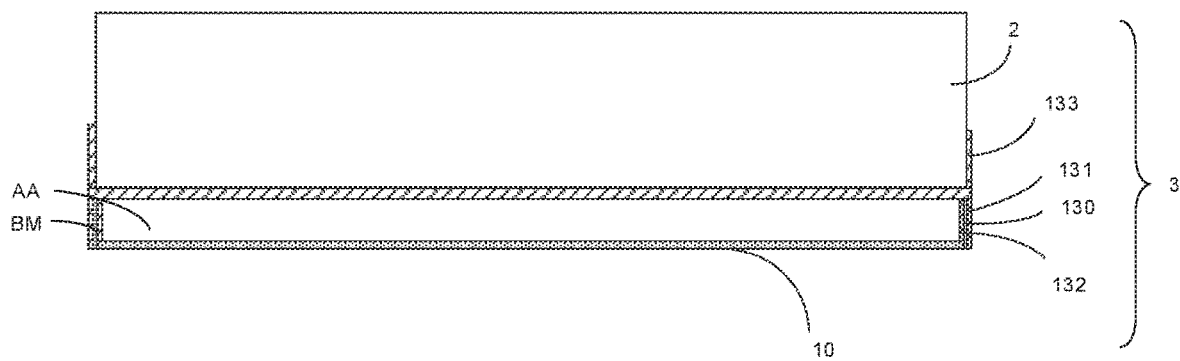
FIG. 16 is a schematic diagram showing a structure of a display apparatus, in accordance with some embodiments of the present disclosure.

As shown in FIGS. 1, 2 and 16, a positioning gap 101 is formed between each two adjacent side walls of the plurality of side walls 100 so as to form at least one positioning gap 101 among the plurality of side walls 100, and at least one light guide positioning portion 110 is disposed on a side surface of the light guide plate body part 111 included in the light guide plate 11. In a case where the at least one light guide positioning portion 110 is engaged with the at least one positioning gap 101 in one-to-one correspondence, the light guide plate 11 may be attached to the back plate 10, and the light guide plate body part 111 may be in contact with the bottom surface 10a. Therefore, the light guide plate 11 may be positioned on the back plate 10 by engaging the at least one light guide positioning portion 110 with a corresponding positioning gap 101. Since the positioning gap 101 is located between each two adjacent side walls of the plurality of side walls 100 that are disposed on the edges of the bottom surface 10a, when positioning the light guide plate 11 on the back plate 10, it is possible to use a existing space between the two adjacent side walls of the plurality of side walls 100 disposed on the edges of the bottom surface 10a as the positioning gap 101. Therefore, there is no need to add an extra positioning structure on the bottom surface 10a to position the light guide plate on the back plate. As a result, in a case where the backlight module 1 is applied to a display apparatus 3, the positioning gap 101 used as a positioning structure will not limit the width of the frame region of the display panel 2, which is conducive for reducing a frame width of the display apparatus 3.

In some embodiments, as shown in FIGS. 1 and 2, the at least one positioning gap 101 is structurally formed by two adjacent side walls of the plurality of side walls 100. In terms of manufacturing method, a plurality of gaps are provided in the side walls of the back plate 10 to serve as a plurality of the positioning gaps 101, and the gaps are spaced apart, so as to ensure that structurally, there is a side wall 100 on each side of a gap. In other words, in a case where a plurality of gaps that are spaced apart are provided in the side walls of the back plate, a positioning gap 101 is formed between each two adjacent side walls of the plurality of side walls 100. Therefore, a thickness of the positioning gap 101 is substantially the same as a thickness of the two adjacent side walls 100 forming the positioning gap 101, and a thickness direction of the positioning gap 101 is the same as a thickness direction of the two adjacent side walls 100 forming the positioning gap 101.

In the related art, the side walls of the back plate are a closed rotary structure disposed around the edges of the bottom surface of the back plate. A cross-sectional shape of the closed rotary structure along a plane perpendicular to a rotary axis is determined by a shape of the bottom surface 10a. For example, if the shape of the bottom surface is a rectangle, the cross-sectional shape of the closed rotary structure along the plane perpendicular to the rotary axis is also a rectangle. If the shape of the bottom surface is a circle, the cross-sectional shape of the closed rotary structure along the plane perpendicular to the rotary axis is also a circle.

In some embodiments, as shown in FIGS. 1 to 6, an orthographic projection of the at least one light guide positioning portion 110 on a plane of the bottom surface 10a overlaps with an orthographic projection of a positioning gap 101 with which the at least one light guide positioning portion is engaged on the plane of the bottom surface 10a. In this way, it is ensured that the at least one light guide positioning portion 110 is engaged with a corresponding positioning gap 101. There are implementation manners, as shown below, for realizing that the orthographic projection of the at least one light guide positioning portion 110 on the plane of the bottom surface 10a overlaps with the orthographic projection of the positioning gap 101 with which the at least one light guide positioning portion is engaged on the plane of the bottom surface 10a.

In one implementation manner, as shown in FIGS. 1 to 5, an outer edge line of the orthographic projection of the at least one light guide positioning portion 110 on the plane of the bottom surface 10a is located within the orthographic projection of the positioning gap 101 with which the at least one light guide positioning portion 110 is engaged on the plane of the bottom surface 10a. In other words, an outermost end of the at least one light guide positioning portion 110 is located in a region inside planes of outer side surfaces of the two side walls 100 adjacent to the positioning gap 101 with which the at least one light guide positioning portion 110 is engaged. In this way, a space occupied by the at least one light guide positioning portion 110 on a frame of the display module may be reduced, and therefore a frame region of the display module may be narrowed.

Figure 6:
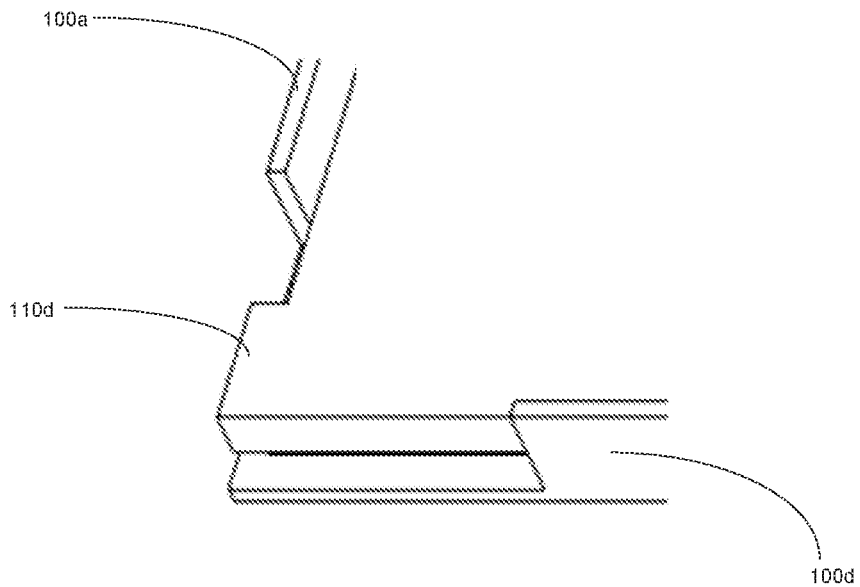
FIG. 6 is an enlarged view showing a structure of a lower-left corner of FIG. 2.

In another implementation manner, as shown in FIGS. 1, 2 and 6, the outer edge line of the orthographic projection of the at least one light guide positioning portion 110 on the plane of the bottom surface 10a exceeds an outer edge of the orthographic projection of the positioning gap 101 with which the at least one light guide positioning portion 110 is engaged on the plane of the bottom surface 10a. In other words, the outermost end of the at least one light guide positioning portion 110 is located in a region outside planes of the outer side surfaces of the two side walls 100 adjacent to the positioning gap 101 with which the at least one light guide positioning portion 110 is engaged. In this way, the outermost end of the light guide positioning portion 110 exceeds beyond the planes of the outer side surfaces of the two side walls 100 adjacent to the positioning gap 101 with which the at least one light guide positioning portion 110 is engaged. However, this may increase a width of the frame region of the backlight module.

As shown in FIGS. 1, 2, 6, 7, 9 and 16, in a case where the outermost end of the at least one light guide positioning portion 110 is in a same plane as the planes of the outer side surfaces of the two side walls 100 adjacent to the positioning gap 101 with which the at least one light guide positioning portion 110 is engaged, if the light guide plate 11 is a side-type light guide plate, after light enters the light guide plate 11, the light will be totally reflected at the outermost end of the at least one light guide positioning portion 110 and enters a display area of the display apparatus 3. In this way, users will see that a position of an image displayed by the display apparatus 3 corresponding to the at least one light guide positioning portion 110 is bright. In order to avoid this problem, it is arranged that the outermost end of the at least one light guide positioning portion 110 exceeds the planes of the outer side surfaces of the two side walls 100 adjacent to the positioning gap 101 with which the at least one light guide positioning portion 110 is engaged.

Figure 9:
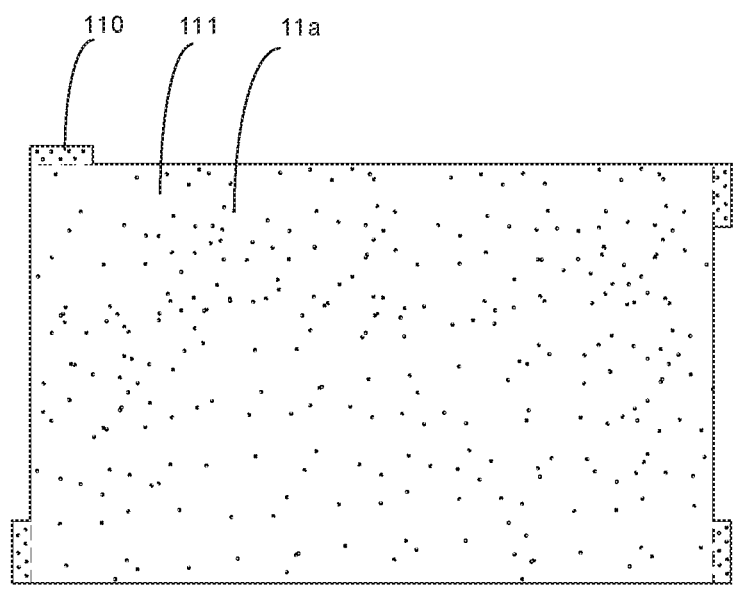
FIG. 9 is a schematic diagram showing a distribution of light guide plate dots on a light guide plate, in accordance with some embodiments of the present disclosure.

As shown in FIGS. 2, 9, and 16, light guide plate dots 11a are distributed in both the light guide plate body part 111 and the at least one light guide positioning portion 110. The light guide plate dots 11a are distributed not only in the light guide plate 11 corresponding to a light-transmitting area AA of the backlight module 1, but also in the light guide plate 11 corresponding to a light-shielding area BM of the backlight module 1. Therefore, after the light enters the light guide plate 11, the light is scattered at dots in the at least one light guide positioning portion 110, and a part of the scattered light is reflected to the light-shielding area BM. As a result, a brightness of a bright position of the image displayed by the display apparatus 3 corresponding to the at least one light guide positioning portion 110 seen by the user may be reduced.

Figure 7:
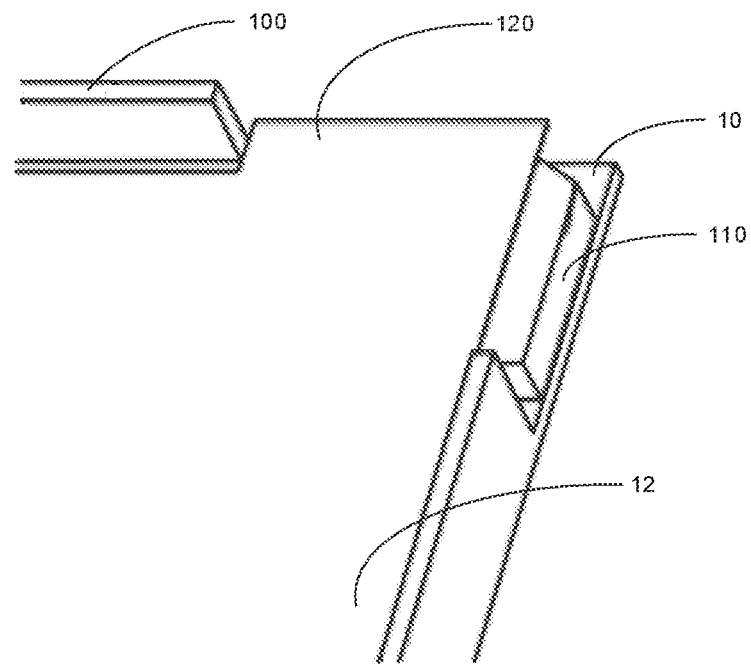
FIG. 7 is a schematic diagram showing how a back plate, a light guide plate and an optical film are fitted together, in accordance with some embodiments of the present disclosure.
Figure 10:
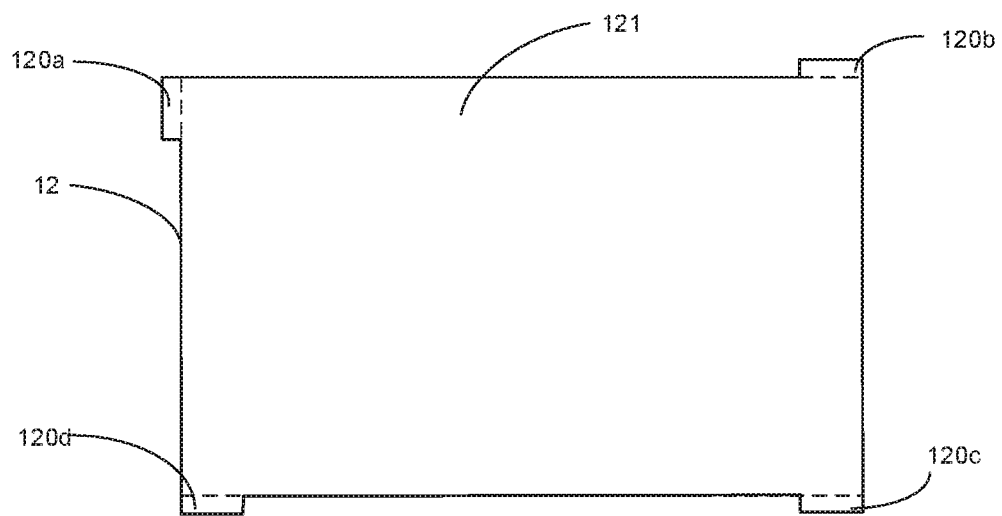
FIG. 10 is a schematic diagram showing a structure of an optical film, in accordance with some embodiments of the present disclosure.

In some embodiments, as shown in FIGS. 7 and 10, the backlight module further includes an optical film 12. In a case where the optical film 12 is disposed on a surface of the light guide plate 11 away from the back plate, the optical film 12 is generally located on a light-emitting surface of the light guide plate 11.

Figure 14:
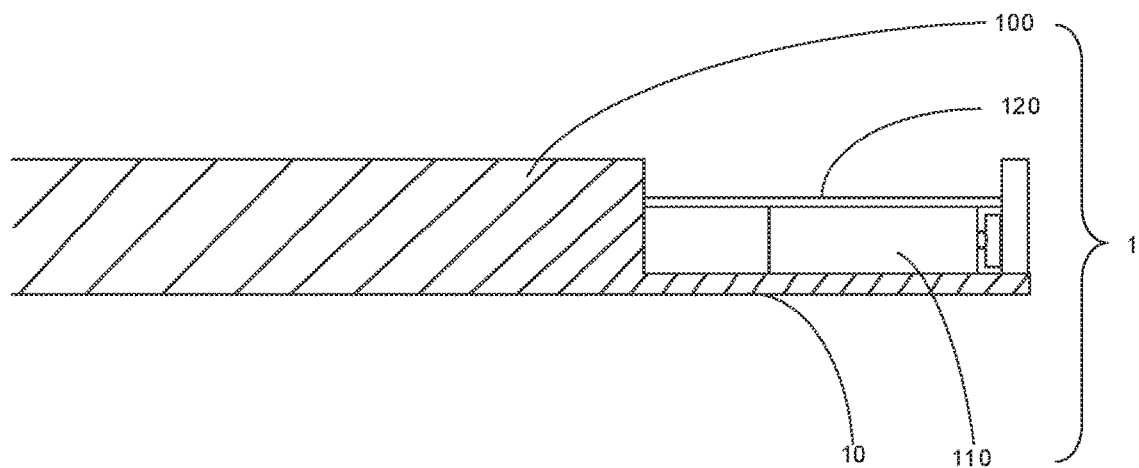
FIG. 14 is a side view of a backlight module, in accordance with some embodiments of the present disclosure.

In some embodiments, as shown in FIGS. 7, 10 and 14, in order to ensure that the optical film 12 is properly positioned on the light-emitting surface of the light guide plate 11, it is arranged that the optical film 12 includes an optical film body part 121 and at least one film positioning portion 120 located on the optical film body part 121. The at least one film positioning portion 120 is engaged with the at least one positioning gap 101 in one-to-one correspondence. The at least one film positioning portion 120 may be made of a same material as the optical film 12.

In some embodiments, as shown in FIGS. 7 and 14, in a case where the plurality of side walls 100 include two side walls 100, there is a positioning gap 101 between the two side walls 100. Correspondingly, only one film positioning portion 120 is provided in the optical film 12.

Figure 11:
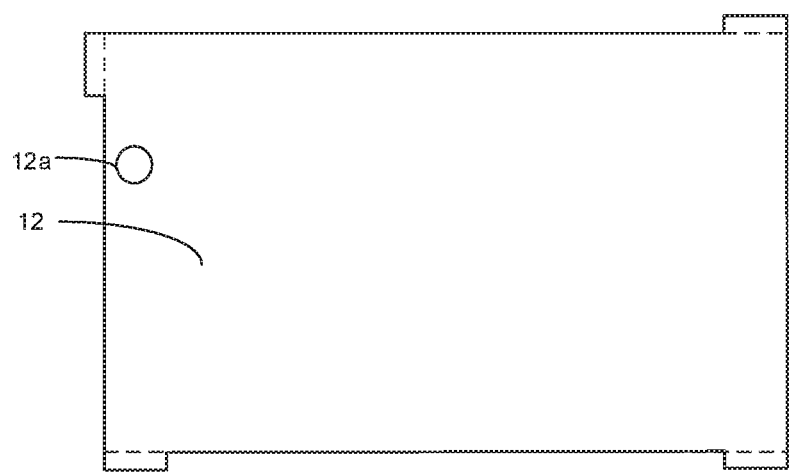
FIG. 11 is a schematic diagram showing positions of positioning mark holes provided on an optical film, in accordance with some embodiments of the present disclosure.

In some embodiments, as shown in FIGS. 7 and 11, in a case where multiple layers of optical films 12 are provided, each of the multiple layers of optical films 12 is provided with an alignment mark hole 12a. In a case where orthogonal projections of alignment mark holes 12a of the multiple layers of optical films 12 on the bottom surface 10a overlap with each other, a position of an image displayed by the display apparatus 3 corresponding to the alignment mark holes 12a will be dark (this problem is referred to as optical face-changing nonuniformity). In order to avoid this problem, it is arranged that orthogonal projections of the alignment mark holes 12a of each of the multiple layers of optical films 12 on the plane of the bottom surface 10a are independent of each other. In this way, a darkness at the position of the image displayed by the display apparatus 3 corresponding to the alignment mark holes 12a may be decreased, thereby alleviating the problem of poor image quality of the display apparatus 3 caused by optical face-changing nonuniformity.

For example, the optical film 12 includes a prism sheet and a diffusion sheet that are stacked. A alignment mark hole 12a is provided on both the prism sheet and the diffusion sheet. In a case where orthographic projections of an alignment mark hole 12a provided on the prism sheet and an alignment mark hole 12a provided on the diffusion sheet on the plane of the bottom surface 10a are independent of each other, the orthographic projections of the alignment mark hole 12a provided on the prism sheet and the alignment mark hole 12a provided on the diffusion sheet on the plane of the bottom surface 10a neither partially nor completely overlap with each other, thereby alleviating the problem of poor image quality of the display apparatus 3 caused by optical face-changing nonuniformity of the prism sheet and the diffusion sheet. A positional relationship between the prism sheet and the diffusion sheet may be set according to actual needs, and is not limited herein.

In some embodiments, as shown in FIGS. 1, 2 and 7, an orthographic projection of the at least one film positioning portion 120 on the plane of the bottom surface 10a overlaps with an orthographic projection of a positioning gap 101 with which the at least one film positioning portion 120 is engaged on the plane of the bottom surface 10a, so as to ensure that the at least one film positioning portion 120 can be engaged with a corresponding positioning gap 101. Since each positioning gap 101 is formed by two adjacent side walls of the plurality of sidewalls 100, a positioning gap 101 formed by two adjacent side walls of the plurality of side walls 100 may be engaged with a film positioning portion 120 included in the optical film 12, so that the positioning gap 101 formed by two adjacent side walls of the plurality of side walls 100 positions the optical film 12.

In some embodiments, as shown in FIGS. 1, 7 and 14, the orthographic projection of the at least one film positioning portion 120 on the plane of the bottom surface 10a overlaps with the orthographic projection of the positioning gap 101 with which the at least one film positioning portion 120 is engaged on the plane of the bottom surface 10a. There are implementation manners, as shown below, for realizing this.

In one implementation manner, as shown in FIGS. 1, 7 and 14, an outer edge line of the orthographic projection of the at least one film positioning portion 120 on the plane of the bottom surface 10a is located within the orthographic projection of the positioning gap 101 with which the at least one film positioning portion 120 is engaged on the plane of the bottom surface 10a. In other words, an outermost end of the film positioning portion 120 is located in a region inside planes of the outer side surfaces of the two side walls 100 adjacent to the positioning gap 101 with which the at least one film positioning portion 120 is engaged. In this way, a space occupied by the at least one film positioning portion 120 in the frame region of the display module may reduced. Therefore, it is conducive for reducing the frame width of the backlight module.

In another implementation manner, as shown in FIGS. 1, 7 and 14, the outer edge line of the orthographic projection of the at least one film positioning portion 120 on the plane of the bottom surface 10a exceeds an outer edge of the orthographic projection of the positioning gap 101 with which the at least one film positioning portion 120 is engaged on the plane of the bottom surface 10a. In other words, the outermost end of the at least one film positioning portion 120 exceeds beyond the planes of the outer side surfaces of the two side walls 100 adjacent to the positioning gap 101 with which the at least one film positioning portion 120 is engaged. As a result, the at least one film positioning portion 120 makes the frame region of the backlight module larger, thereby causing a slight increase in the width of the frame region of the backlight module.

In some embodiments, as shown in FIGS. 1, 2 and 7, in a case where the at least one film positioning portion 120 is engaged with the at least one positioning gap 101 in one-to-one correspondence, a height of two adjacent side walls of the plurality of side walls 100 forming the at least one positioning gap 101 with which the film positioning portion 120 is engaged is at least greater than a thickness of the light guide plate 11. In this way, after the positioning gap 101 formed by the two adjacent side walls of the plurality of side walls 100 is engaged with a corresponding light guide positioning portion 110, there is still room in a height direction of the two adjacent side walls of the plurality of side walls 100 for engaging a corresponding film positioning portion 120. It will be understood that, a height direction of the two adjacent side walls of the plurality of side walls 100 of this embodiment are the same as both a thickness direction of the light guide plate 11 and a thickness direction of the optical film 12.

Illustratively, as shown in FIGS. 1, 7 and 14, in order to better position the optical film 12, it is arranged the height of two adjacent side walls of the plurality of side walls 100 is at least equal to a sum of a thickness of the light guide plate 11 and a thickness of the optical film 12. However, in order to minimize an effect of a height of each of the plurality of side walls 100 on a thickness of the backlight module, it is arranged that the height of two adjacent side walls of the plurality of side walls 100 is equal to the sum of the thickness of the light guide plate 11 and the thickness of the optical film 12, so as to reduce the effect on the thickness of the backlight module 1 while ensuring a positioning accuracy of the light guide plate 11 and the optical film 12. Thus, the backlight module 1 will have a potential to become thinner and lighter.

Figure 8:
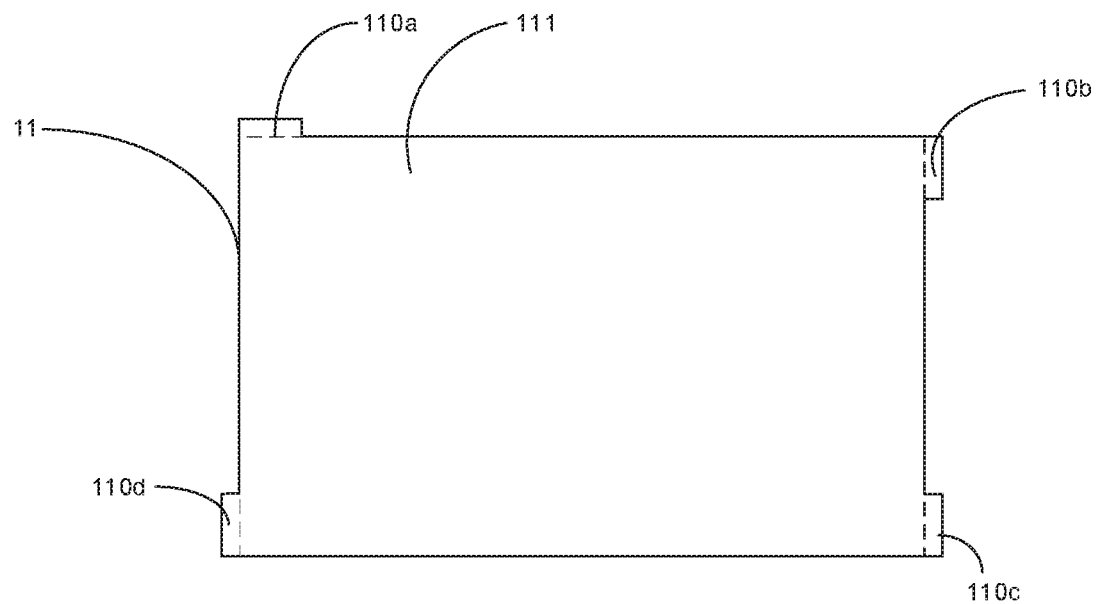
FIG. 8 is a schematic diagram showing a structure of a light guide plate, in accordance with some embodiments of the present disclosure.
Figure 12:
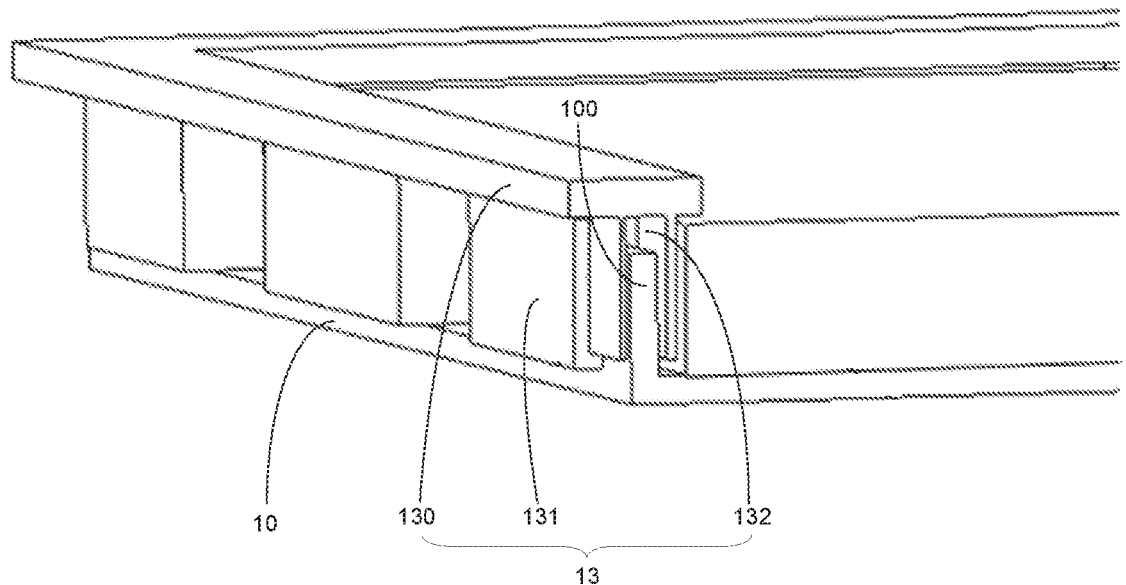
FIG. 12 is a schematic diagram showing how a mold frame and a back plate are fitted together, in accordance with some embodiments of the present disclosure.
Figure 13:
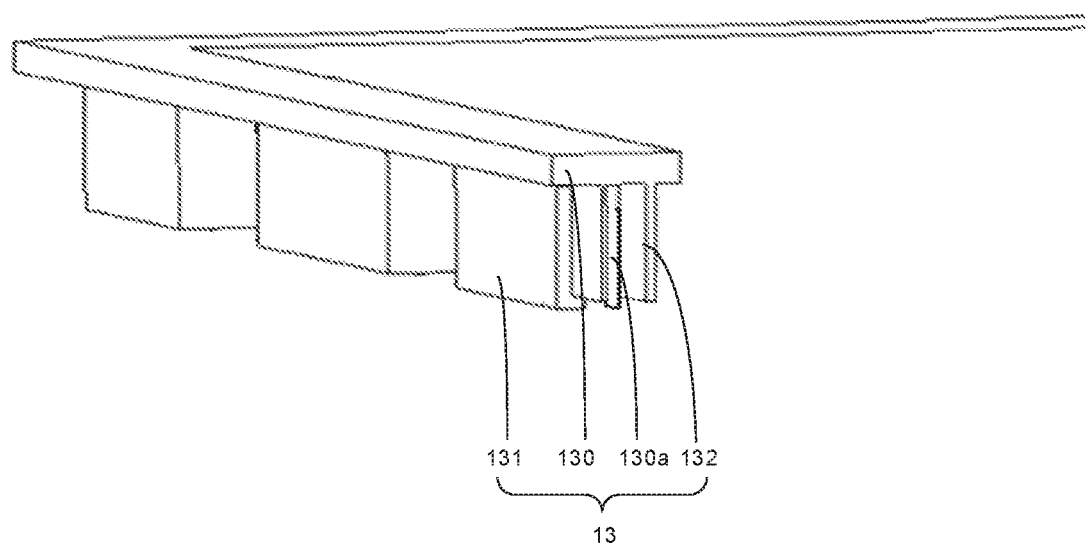
FIG. 13 is a schematic diagram showing a structure of a mold frame, in accordance with some embodiments of the present disclosure.

In some embodiments, as shown in FIGS. 1 and 12, the plane of each of the plurality of side walls 100 is perpendicular to the plane of the bottom surface 10a. As shown in FIGS. 1, 2 and 8, the at least one light guide positioning portion 110 and the light guide plate body part 111 are located on a same plane. Therefore, after the light guide plate body part 111 comes in contact with the bottom surface 10a, it may be ensured that the at least one light guide positioning portion 110 is engaged with a corresponding positioning gap 101 in one-to-one correspondence.

Since the plurality of side walls 100 are disposed on edges of the bottom surface 10a included in the back plate, the plurality of side walls 100 only occupy a space of the bottom surface 10a in a thickness direction. Therefore, in a case where a plurality of side walls 100 are provided on the edges of the bottom surface 10a, the positioning gaps 101 formed by each two adjacent side walls of the plurality of side walls 100 are on the edges of the bottom surface 10a. As a result, neither do the positioning gaps 101 formed by each two adjacent side walls of the plurality of sidewalls 100 occupy a space above the back plate 10 where the bottom surface 10a is located, nor do the positioning gaps 101 extend the bottom surface 10a. Therefore, in a case where the light guide plate 11 is positioned on the bottom surface 10a, the thickness of the backlight module may not be excessively increased, and an area of the bottom surface may not be increased.

In some embodiments, as shown in FIGS. 1 to 11, an optical film body part 121 and the at least one film positioning portion 120 are located on a same plane. Thus, the at least one film positioning portion 120 will not affect an overall thickness of the optical film 12. Therefore, it may be ensured that the overall thickness of the optical film 12 is relatively thin.

In some embodiments, as shown in FIGS. 2 to 11, in a case where the at least one light guide positioning portion 110 is engaged with the at least one positioning gap 101 in one-to-one correspondence, and the at least one film positioning portion 120 is engaged with the at least one positioning gap 101 in one-to-one correspondence, the positioning gap 101 that is engaged with one of the at least one light guide positioning portion 110 and the positioning gap 101 that is engaged with one of the at least one film positioning portion 120 may be a same positioning gap 101, or different positioning gaps 101.

In some embodiments, as shown in FIGS. 1 to 6, there is a tendency for the light guide plate 11 and the optical film 12 to move relative to each other, resulting in a decrease in backlight quality of the backlight module. In order to avoid this problem, it is arranged that the at least one light guide positioning portion 110 and the at least one film positioning portion 120 share at least one positioning gap 101 in one-to-one correspondence. In other words, one of the at least one film positioning portion 120 shares a same positioning gap 101 with one of the at least one light guide positioning portion 110. Each positioning gap 101 includes a first direction positioning gap 1011 and a second direction positioning gap 1012 that are communicated with each other. There is a positioning angle between an orthographic projection of the first direction positioning gap 1011 on the plane of the bottom surface 10*a* and an orthographic projection of the second direction positioning gap 1012 on the plane of the bottom surface 10*a*. The positioning angle is neither 0 nor 360°, so that the first direction positioning gap 1011 and the second direction positioning gap 1012 included in each positioning gap 101 are disposed in different directions.

It will be understood that, as shown in FIG. 1, the orthographic projection of the first direction positioning gap 1011 on the plane of the bottom surface 10*a* may be regarded as a relatively thick straight line. This line is referred to as a first direction straight line. Similarly, the orthographic projection of the second direction positioning gap 1012 on the plane of the bottom surface 10*a* may also be regarded as a relatively thick straight line. This line is referred to as a second direction straight line. An angle between the first direction straight line and the second direction straight line is the positioning angle.

Illustratively, as shown in FIGS. 7 and 11, in a case where the at least one film positioning portion 120 and the at least one light guide positioning portion 110 are in one-to-one correspondence, the at least one light guide positioning portion 110 is engaged with the at least one positioning gap 101 in one-to-one correspondence, and the at least one film positioning portion 120 is engaged with the at least one positioning gap 101 in one-to-one correspondence. One light guide positioning portion of the at least one light guide positioning portion 110 is engaged with a first direction positioning gap 1011 included in the positioning gap 101. One film positioning portion of the at least one film positioning portion 120 is engaged with a second direction positioning gap 1012 included in the positioning gap 101.

Therefore, for a first direction corresponding to the first direction positioning gap 1011 and a second direction corresponding to the second direction positioning gap 1012, in a case where there is a tendency for the light guide plate 11 and the optical film 12 to move relative to each other, if the light guide plate 11 moves in a direction perpendicular to the first direction and the optical film 12 moves in a direction perpendicular to the second direction, there is a positioning angle between the orthographic projection of the first direction positioning gap 1011 on the plane of the bottom surface 10*a* and the orthographic projection of the second direction positioning gap 1012 on the plane of the bottom surface 10*a*. In a case where the positioning angle is neither 0° nor 360°, the direction in which the light guide plate 11 moves and the direction in which the optical film 12 moves are different. Therefore, in a case where the light guide plate 11 moves in a direction perpendicular to the first direction of the positioning gap 101, the light guide plate 11 generates a certain resistance to the optical film 12 moving in a direction perpendicular to the second direction of the positioning gap 101, so that the light guide plate 11 play a certain role in positioning the optical film 12. Similarly, in a case where the optical film 12 moves in a direction perpendicular to the second direction of the positioning gap 101, the optical film 12 generates a certain resistance to the light guide plate 11 moving in a direction perpendicular to the first direction of the positioning gap 101, therefore the optical film plays a certain role in positioning the light guide plate 11. Therefore, in some embodiments, in a case where an angle formed by a line of the first direction and a line of the second direction is neither 0° nor 360°, if the light guide plate 11 and the optical film 12 move relative to each other, the light guide plate 11 and the optical film 12 may position each other through mutual cooperation, thereby reducing relative movement between the light guide plate 11 and the optical film 12.

In some embodiments, as shown in FIG. 1, the positioning angle falls in a range of 75°-135°. Therefore, the positioning angle not only ensures that the shape of the bottom surface 10*a* is not greatly affected, but also facilitates mutual positioning of the light guide plate 11 and the optical film 12.

In some embodiments, each edge of the bottom surface 10*a* is generally a straight-line edge. In a case where two side walls are provided on edges of the bottom surface 10*a*, in order to make a positioning gap 101 formed by the two side walls 100 include a first direction positioning gap 1011 and a second direction positioning gap 1012, the two side walls need to be disposed on two adjacent edges of the bottom surface 10*a* (extending directions of the two edges are different).

Illustratively, FIGS. 1 and 2 show a structure of the positioning gap 101. The positioning gap 101 is located at a corner of the bottom surface 10*a*. The corner of the bottom surface 10*a* refers to an intersection of two adjacent edges of the bottom surface 10*a*. A positioning angle formed by an orthographic projection of the first direction positioning gap 1011 on a plane of the bottom surface 10*a* and an orthographic projection of the second direction positioning gap 1012 on the plane of the bottom surface 10*a* included in the positioning gap 101 is 90°.

In some embodiments, the at least one light guide positioning portion 110 is a protruding light guide positioning portion and the at least one film positioning portion 120 is a protruding film positioning portion. As can be seen from FIGS. 1 and 2, since the first direction positioning gap 1011 and the second direction positioning gap 1012 included in each positioning gap 101 are disposed in different directions, protruding directions of the protruding light guide positioning portion 110 and the protruding film positioning portion 120 that share a same positioning gap 101 are different.

In some embodiments, for the side-type light guide plate 11, a light incident surface of the light guide plate 11 is located on a side surface of the light guide plate 11, and is perpendicular to a plane of a plate surface of the light guide plate 11. The protruding direction of the protruding light guide positioning portion 110 is parallel to a plane of a plate surface of the light guide plate body part 111. In other words, the protruding direction of the protruding light guide positioning portion 110 is a vector having a direction that is parallel to the plane of the plate surface of the light guide plate body part 111. Each film positioning portion 120 is from the optical film body part 121. The protruding direction of the protruding film positioning portion 120 is parallel to the plate surface of the optical film body part 121. In other words, the protruding direction of the protruding film positioning portion 120 is a vector having a direction that is parallel to the plane of the plate surface of the optical film body part 121.

In one implementation manner, a protruding direction of a protruding light guide positioning portion 110 that shares a same positioning gap 101 with the above protruding film positioning portion 120 is perpendicular to the light incident surface of the light guide plate 11. A protruding direction of a protruding film positioning portion 120 that shares a same positioning gap 101 with the above protruding light guide positioning portion 110 is parallel to the light incident surface of the light guide plate 11. In this way, a positioning angle formed by the orthographic projection of the first direction positioning gap 1011 on the plane of the bottom surface 10a and the orthographic projection of the second direction positioning gap 1012 on the plane of the bottom surface 10a included in the positioning gap 101 shared by the protruding light guide positioning portion and the protruding film positioning portion is 90°.

In another implementation manner, the protruding direction of the protruding light guide positioning portion that shares the same positioning gap 101 with the above protruding film positioning portion 120 is parallel to the light incident surface of the light guide plate 11, and the protruding direction of the protruding film positioning portion that shares the same positioning gap 101 with the above protruding light guide positioning portion is perpendicular to the light incident surface of the light guide plate 11. In this way, the positioning angle formed by the orthographic projection of the first direction positioning gap 1011 on the plane of the bottom surface 10a and the orthographic projection of the second direction positioning gap 1012 on the plane of the bottom surface 10a included in the positioning gap 101 shared by the protruding light guide positioning portion and the protruding film positioning portion is 90°.

Figure 4:
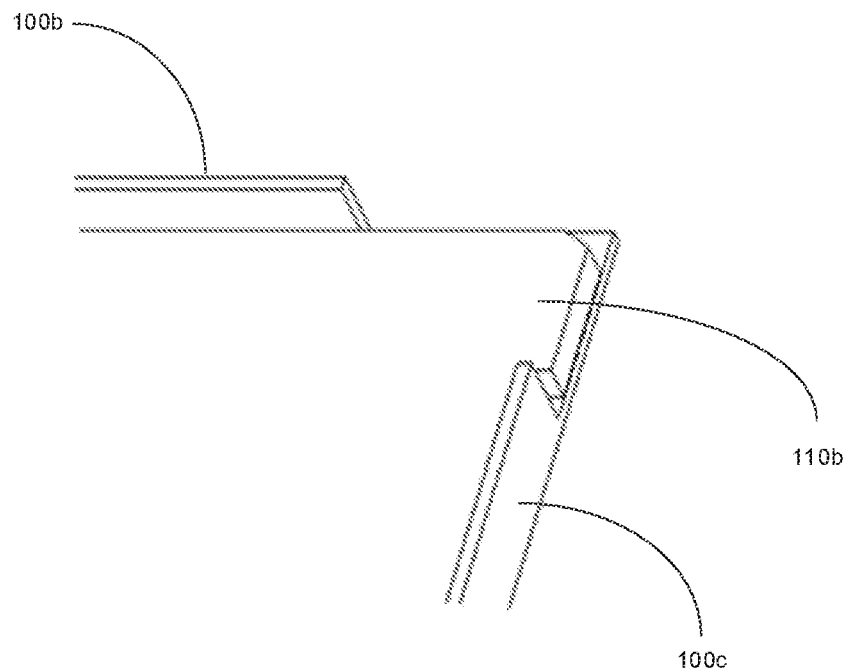
FIG. 4 is an enlarged view showing a structure of an upper-right corner of FIG. 2.
Figure 5:
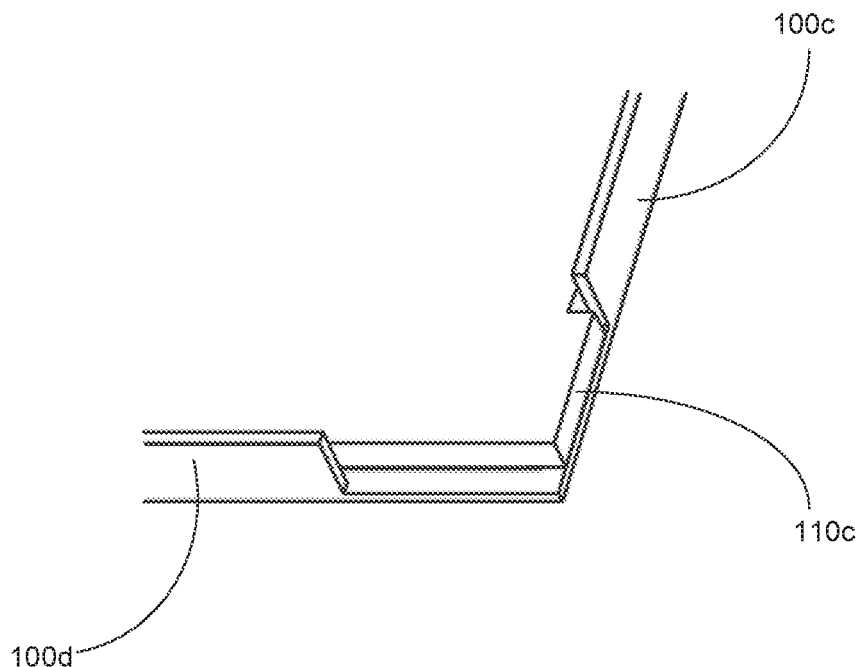
FIG. 5 is an enlarged view showing a structure of a lower-right corner of FIG. 2.

Illustratively, as shown in FIG. 4, a plurality of protruding light guide positioning portions are provided, and a plurality of protruding film positioning portion are provided. At least two of the plurality of protruding light guide positioning portions have different protruding directions, and at least two of the plurality of protruding film positioning portions have different protruding directions.

A technical effect of a design in which at least two protruding light guide positioning portions have different protruding directions will be described below by taking an example in which the plurality of protruding light guide positioning portions include two protruding light guide positioning portions having different protruding directions. Correspondingly, there will be two protruding film positioning portions having different protruding directions in the plurality of protruding film positioning portions. The two protruding film positioning portions having different protruding directions are in one-to-one correspondence with the two protruding light guide positioning portions having different protruding directions.

In a case where the protruding directions of the two protruding light guide positioning portions are different, if the light guide plate moves, the light guide plate 11 not only moves toward a protruding direction of a first protruding light guide positioning portion, but also has a tendency to move toward a protruding direction of a second protruding light guide positioning portion. As a result, a force that causes the light guide plate to move toward the protruding direction of the first protruding light guide positioning portion and a force that causes the light guide plate to move toward the protruding direction of the second protruding light guide positioning portion cancel each other out, thereby reducing a probability of movement of the light guide plate 11.

Similarly, in a case where the protruding directions of the two protruding film positioning portions are different, a probability of movement of the optical film 12 may also be reduced.

Illustratively, the following three structures may be adopted to reduce the probability of movement of the light guide plate 11 and the probability of movement of the optical film 12, but the present disclosure is not limited to the following three structures.

A first structure: along a circumferential direction of the side surface of the light guide plate body part 111, a protruding direction of each of the plurality of protruding light guide positioning portions changes clockwise; and along a circumferential direction of a side surface of the optical film body part 121, a protruding direction of each of the plurality of protruding film positioning portions changes clockwise.

A second structure: along the circumferential direction of the side surface of the light guide plate body part 111, the protruding direction of each of the plurality of protruding light guide positioning portions changes counterclockwise; and along the circumferential direction of the side surface of the optical film body part 121, the protruding direction of each of the plurality of protruding film positioning portions changes counterclockwise.

A third structure: along the circumferential direction of the side surface of the light guide plate body part 111, the protruding direction of each of the plurality of protruding light guide positioning portions changes alternately; and along the circumferential direction of the side surface of the optical film body part 121, the protruding direction of each of the plurality of protruding film positioning portions changes alternately.

In a case where the first structure and the second structure are adopted to reduce the probability of movement of the light guide plate 11 and the probability of movement of the optical film 12, the light guide plate 11 and the optical film 12 may have a tendency to move in more directions. In this case, forces applied to the light guide plate 11 and the optical film 12 have many directions. As a result, the forces in different directions applied to the light guide plate 11 and the optical film 12 may sufficiently cancel each other out, thereby further reducing the probability of movement of the light guide plate 11 and the optical film 12.

Illustratively, FIG. 8 shows a light guide plate 11, which includes a light guide plate body part 111 and four protruding light guide positioning portions. The four protruding light guide positioning portions include a first protruding light guide positioning portion 110a (upper left corner), a second protruding light guide positioning portion 110b (upper right corner), a third protruding light guide positioning portion 110c (lower right corner), and a fourth protruding light guide positioning portion 110d (lower left corner). As can be seen from FIG. 8, a protruding direction of the first protruding light guide positioning portion 110a is toward an upper direction of FIG. 8; a protruding direction of the second protruding light guide positioning portion 110b is toward a right direction of FIG. 8; a protruding direction of the third protruding light guide positioning portion 110c is toward a right direction of FIG. 8; and a protruding direction of the fourth protruding light guide positioning portion 110d is toward a left direction of FIG. 8.

FIGS. 3-6 show a cooperation relationship of the light guide plate 11 and the back plate 10 shown in FIG. 8. The back plate 10 includes a bottom surface 10a of a rectangular structure and four side walls 100. The four side walls 100 are a first side wall 100a, a second side wall 100b, a third side wall 100c, and a fourth side wall 100d. The first side wall 100a is located on a left edge of the bottom surface 10a shown in FIGS. 3 and 6. The second side wall 100b is located on an upper edge of the bottom surface 10a shown in FIGS. 3 and 4. The third side wall 100c is located on a right edge of the bottom surface 10a shown in FIGS. 4 and 5. The fourth side wall 100d is located on a lower edge of the bottom surface 10a shown in FIGS. 6 and 7.

Figure 3:
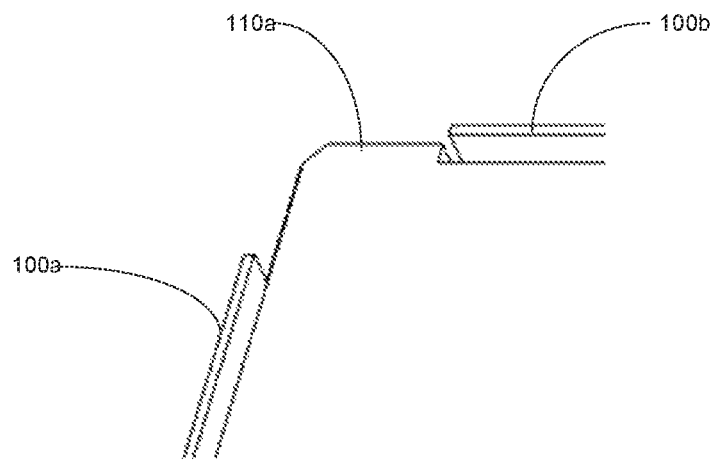
FIG. 3 is an enlarged view showing a structure of an upper-left corner of FIG. 2.

The first protruding light guide positioning portion 110a is engaged in a first positioning gap formed by the first side wall 100a and the second side wall 100b toward an upper direction of FIG. 3. The second protruding light guide positioning portion 110b is engaged in a second positioning gap formed by the second side wall 100b and the third side wall 100c toward a right direction of FIG. 4. The third protruding light guide positioning portion 110c is engaged in a third positioning gap formed by the third side wall 100c and the fourth side wall 100d toward a right direction of FIG. 5. The fourth protruding light guide positioning portion 110d is engaged in a fourth positioning gap formed by the fourth side wall 100d and the first side wall 100a toward a left direction of FIG. 6.

FIG. 10 shows an optical film 12, which includes an optical film body part 121 and four film positioning portions 120. The four film positioning portions 120 include a first protruding film positioning portion 120a, a second protruding film positioning portion 120b, a third protruding film positioning portion 120c, and a fourth protruding film positioning portion 120d. As can be seen from FIG. 10, a protruding direction of the first protruding film positioning portion 120a is toward a left direction of FIG. 10. A protruding direction of the second protruding film positioning portion 120b is toward an upper direction of FIG. 10. A protruding direction of the third protruding film positioning portion 120c is toward a lower direction of FIG. 10. A protruding direction of the fourth protruding film positioning portion 120d is toward the lower direction of FIG. 10.

FIG. 7 only shows a cooperating relationship of a film positioning portion 120 and a positioning gap 101. However, as shown in FIGS. 1 to 7, according to an above analysis of the positioning angle formed by the orthographic projections of the protruding film positioning portion and the protruding light guide positioning portion that share the same positioning gap 101 on the plane of the bottom surface 10a, in a case where a shape of the bottom surface 10a is a rectangle, and two adjacent side walls of the plurality of side walls 100 forming the positioning gap 101 are located on two adjacent edges of the bottom surface 10a, if the positioning angle is 90°, the protruding direction of the protruding film positioning portion is perpendicular to the protruding direction of the protruding light guide positioning portion. Therefore, in a case where the optical film 12, the light guide plate 11, and the back plate 10 are fitted together, the first protruding film positioning portion 120a is engaged in the first positioning gap formed by the first side wall 100a and the second side wall 100b toward a left direction of FIG. 3; the second protruding film positioning portion 120b is engaged in the second positioning gap formed by the second side wall 100b and the third side wall 100c toward an upper direction of FIG. 4; the third protruding film positioning portion 120c is engaged in the third positioning gap formed by the third side wall 100c and the fourth side wall 100d toward a lower direction of FIG. 5; and the fourth protruding film positioning portion 120d is engaged in the fourth positioning gap formed by the fourth side wall 100d and the first side wall 100a toward a lower direction of FIG. 6.

In some embodiments, as shown in FIGS. 12 to 15, in order to avoid wear of the edges of the light guide plate 11 and the optical film 12 by the plurality of side walls 100, a first buffer space 1321 is provided between a side surface of the light guide plate body part 111 and each of the plurality of side walls 100, and a second buffer space 1322 is provided between a side surface of the optical film body part 121 and each of the plurality of side walls 100. The first buffer space 1321 are in one-to-one correspondence with each of the plurality of side walls 100 and the second buffer space 1322 are in one-to-one correspondence with each of the plurality of side walls 100. The first buffer space 1321 and the second buffer space 1322 corresponding to each of the plurality of side walls 100 are communicated with each other and together constitute a buffer receiving region 1320. An inner buffer sheet 132 is disposed in the buffer receiving region 1320.

At least one inner buffer sheet 132 is disposed in the buffer receiving region 1320. Therefore, in a case where the light guide plate 11 and the optical film 12 move, the at least one inner buffer sheet 132 may prevent the light guide plate 11 and the optical film 12 from directly hitting at least one of the plurality of side walls 100. Therefore, the at least one inner buffer sheet 132 buffers an intensity of a force of the light guide plate 11 and the optical film 12 hitting the at least one of the plurality of side walls 100, thereby reducing an influence of the at least one positioning gap 101 on a function of positioning the light guide plate 11 and the optical film 12.

In addition, since the at least one inner buffer sheet 132 may buffer the intensity of the force of the light guide plate 11 and the optical film 12 hitting the at least one of the plurality of side walls 100, a reaction force of the at least one of the plurality of side walls 100 to the light guide plate 11 and the optical film 12 may be attenuated. Therefore, by providing the at least one inner buffer sheet 132 in the buffer receiving region, it may be possible to reduce a degree of wear of the light guide plate 11 and the optical film 12 by the at least one of the plurality of side walls 100 during use of the display module.

Figure 15:
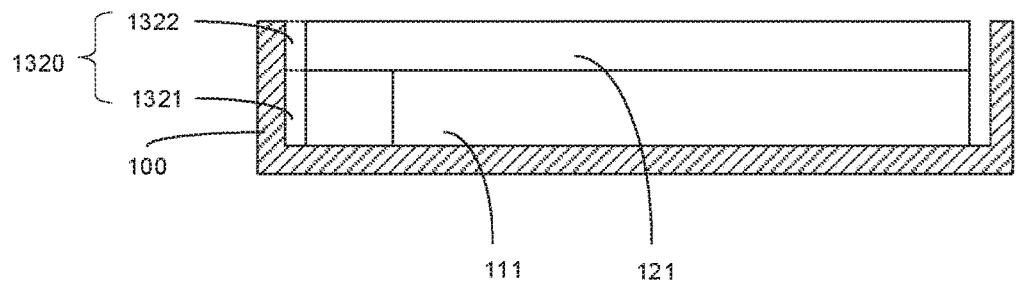
FIG. 15 is a schematic diagram showing a structure of a buffer receiving region, in accordance with some embodiments of the present disclosure.

In some embodiments, as shown in FIGS. 12 and 15, the backlight module 1 further includes a mold frame 13. The mold frame 13 includes a mold frame body 130 and at least one outer buffer sheet 131. The at least one outer buffer sheet 131 is in one-to-one correspondence with at least one inner buffer sheet 132. The at least one outer buffer sheet 131 and the at least one inner buffer sheet 132 are disposed on a same surface of the mold frame body 130. The mold frame body, each of the at least one outer buffer sheet 131, and a corresponding one of the at least one inner buffer sheet 132 together form a side wall recessed gap 130a having a recessed port. At least one of the plurality of side walls 100 is inserted into at least one side wall recessed gap 130a through the recessed port in one-to-one correspondence.

The mold frame body 130 is located on a side of the optical film 12 away from the light-emitting surface of the light guide plate 11 (the light guide plate 11 and the optical film 12 are not shown in FIG. 12). A position of the mold frame body 130 is a light-shielding region BM, and the mold frame body 130 is a mold frame body of a loop structure. A region enclosed by the mold frame body of a loop structure is a light-transmitting region, which allows light guided by the light guide plate 11 and the optical film 12 to pass through.

Since the at least one of the plurality of side walls 100 is inserted into the side wall recessed gap 130a through the recessed port in one-to-one correspondence, so that the side wall recessed gap 130a protects the side wall 100 inserted into in the side wall recessed gap 130a.

In some embodiments, as shown in FIGS. 12 to 16, since the at least one inner buffer sheet 132 and the at least one outer buffer sheet 131 have a certain buffer function, and a material used for making the mold frame 13 also has a buffer function, the at least one outer buffer sheet 131, the at least one inner buffer sheet 132, and the mold frame body 130 may be fabricated at once by a one-piece molding process using a same buffer material.

As shown in FIGS. 14 to 16, some embodiments of the present disclosure further provide a display apparatus 3. The display apparatus includes the backlight module 1 described above.

Compared with the related art, the display apparatus provided by some embodiments of the present disclosure has the same beneficial effects as the beneficial effects of the backlight module described above, which are not described herein again.

In some embodiments, the display apparatus may be a mobile phone, a tablet computer, a television, a display, a notebook computer, a digital photo frame, a navigator, or any other product or component having a display function.

In some embodiments, as shown in FIG. 15, the display apparatus 3 generally further includes a display panel 2. In order to prevent light leakage, the mold frame 13 in the backlight module further includes a protective cover 133. The protective cover 133 is disposed on a surface of a mold frame body 130 on which an inner buffer sheet 132 is not formed, so that the display panel 2 is located inside the protective cover 133. Therefore, the protective cover 133 not only protects the display panel 2, but also encapsulates a connection portion of the backlight module and the display panel 2, thereby preventing leakage of light provided by the backlight module to the display panel 2 at the connection portion.

In some embodiments, as shown in FIG. 16, the protective cover 133 is generally made of a buffer material, and the mold frame body 130, the at least one inner buffer sheet 132 and the at least one outer buffer sheet 131 may also be made of a buffer material. Therefore, the protective cover 133, the mold frame body 130, the at least one inner buffer sheet 132 and the at least one outer buffer sheet 131 may be fabricated by a once-piece molding process.

It will be noted that, as shown in FIG. 16, the light-shielding region BM of the display panel 2 at least correspond to a position of the mold frame body 130 in the backlight module. In other words, the frame region of the display panel 2 at least corresponds to a position of the position of the mold frame body 130 in the backlight module. At this time, an orthographic projection of the frame region of the display panel 2 on the light guide plate 11 partially overlaps with an edge of the light guide plate 11, so that the light guide plate dots at a protruding light guide positioning portion of the light guide plate 11 corresponds to the light-shielding region BM.

In the above description of the embodiments, specific features, structures, materials or characteristics may be combined in any suitable manner in any one or more embodiments or examples.

The foregoing descriptions are merely specific implementation manners of the present disclosure, but the protection scope of the present disclosure is not limited thereto. Any person skilled in the art could readily conceive of changes or replacements within the technical scope of the present disclosure, which shall all be included in the protection scope of the present disclosure. Therefore, the protection scope of the present disclosure shall be subject to the protection scope of the claims.

What is claimed is:

1. A backlight module, comprising a back plate, a light guide plate and an optical film, wherein
   the light guide plate and the back plate are stacked together;
   the optical film is located on a surface of the light guide plate away from the back plate;
   the back plate includes a bottom surface and a plurality of side walls located on edges of the bottom surface; an inner side wall of each of the plurality of side walls is a straight-line inner side wall; a positioning gap is formed between each two adjacent side walls of the plurality of side walls;
   the light guide plate includes a light guide plate body part and at least one light guide positioning portion disposed on a side surface of the light guide plate body part; and
   the at least one light guide positioning portion is engaged with a corresponding positioning gap;
   the optical film includes an optical film body part and at least one film positioning portion disposed on the optical film body part; and the at least one film positioning portion is engaged with a corresponding positioning gap;
   at least one positioning gap includes a first direction positioning gap and a second direction positioning gap that are communicated with each other; there is a positioning angle between an orthographic projection of the first direction positioning gap included in each positioning gap on a plane of the bottom surface and an orthographic projection of the second direction positioning gap included in a same positioning gap on the plane of the bottom surface; and the positioning angle falls in a range of 75°-135°;
   one film positioning portion of the at least one film positioning portion and one light guide positioning portion of the at least one light guide positioning portion share a same positioning gap; the one light guide positioning portion is engaged with a first direction positioning gap included in the same positioning gap; and the one film positioning portion is engaged with a second direction positioning gap included in the same positioning gap;
   each of the at least one light guide positioning portion is a protruding light guide positioning portion, and each of the at least one film positioning portion is a protruding film positioning portion; and
   protruding directions of a protruding light guide positioning portion and a protruding film positioning portion that share a same positioning gap are different.

2. The backlight module according to claim 1, wherein an orthographic projection of the at least one film positioning portion on a plane of the bottom surface at least partially overlaps with an orthographic projection of a positioning gap with which the at least one film positioning portion is engaged on the plane of the bottom surface; and an orthographic projection of the at least one light guide positioning portion on the plane of the bottom surface at least partially overlaps with an orthographic projection of a positioning gap with which the at least one light guide positioning portion is engaged on the plane of the bottom surface.

3. The backlight module according to claim 2, wherein
   an outer edge line of the orthographic projection of the at least one light guide positioning portion on the plane of the bottom surface is located within the orthographic projection of the positioning gap with which the at least one light guide positioning portion is engaged on the plane of the bottom surface; and
   an outer edge line of the orthographic projection of the at least one film positioning portion on the plane of the bottom surface is located within the orthographic projection of the positioning gap with which the at least one film positioning portion is engaged on the plane of the bottom surface.

4. The backlight module according to claim 2, wherein,
a thickness of the positioning gap is the same as a thickness of two adjacent side walls forming the positioning gap, and a thickness direction of the positioning gap is the same as a thickness direction of the two adjacent side walls forming the positioning gap;
a height of the positioning gap is the same as a height of two adjacent side walls forming the positioning gap, and a height direction of the positioning gap is the same as a height direction of the two adjacent side walls forming the positioning gap.

5. The backlight module according to claim 4, wherein, the height of two adjacent side walls forming the at least one positioning gap is equal to the sum of a thickness of the light guide plate and a thickness of the optical film.

6. The backlight module according to claim 1, wherein the at least one light guide positioning portion is engaged with at least one positioning gap in one-to-one correspondence, and the at least one film positioning portion is engaged with the at least one positioning gap in one-to-one correspondence.

7. The backlight module according to claim 1, wherein a plane of each of the plurality of side walls is perpendicular to a plane of the bottom surface; the at least one light guide positioning portion and the light guide body part are located on a same plane; and the optical film body part and the at least one film positioning portion are located on a same plane.

8. The backlight module according to claim 1, wherein at least one light guide positioning portion and at least one film positioning portion share at least one positioning gap in one-to-one correspondence.

9. The backlight module according to claim 1, wherein
the at least one light guide positioning portion is a protruding light guide positioning portion, and a protruding direction of the at least one light guide positioning portion is parallel to a plate surface of the light guide plate body part;
the at least one film positioning portion is a protruding film positioning portion, and a protruding direction of the at least one film positioning portion is parallel to a plate surface of the optical film body part;
a protruding direction of a protruding light guide positioning portion that shares a same positioning gap with a protruding film positioning portion is perpendicular to a light incident surface of the light guide plate, and a protruding direction of the protruding film positioning portion that shares the same positioning gap with the protruding light guide positioning portion is parallel to the light incident surface of the light guide plate; or
the protruding direction of the protruding light guide positioning portion that shares the same positioning gap with the protruding film positioning portion is parallel to the light incident surface of the light guide plate, and the protruding direction of the protruding film positioning portion that shares the same positioning gap with the protruding light guide positioning portion is perpendicular to the light incident surface of the light guide plate.

10. The backlight module according to claim 1, wherein a plurality of protruding light guide positioning portions are provided, and a plurality of protruding film positioning portions are provided;
at least two of the plurality of protruding light guide positioning portions have different protruding directions, and at least two of the plurality of protruding film positioning portions have different protruding directions.

11. The backlight module according to claim 10, wherein
along a circumferential direction of the side surface of the light guide plate body part, a protruding direction of each of the plurality of protruding light guide positioning portions changes clockwise, counterclockwise, or alternately;
along a circumferential direction of a side surface of the optical film body part, a protruding direction of each of the plurality of protruding film positioning portions changes clockwise, counterclockwise, or alternately.

12. The backlight module according to claim 1, further comprising a mold frame, wherein the mold frame includes a mold frame body and at least one inner buffer sheet;
wherein a first buffer space is provided between the side surface of the light guide plate body part and each of the plurality of side walls, and a second buffer space is provided between a side surface of the optical film body part and each of the plurality of side walls;
the first buffer space is in one-to-one correspondence with each of the plurality of side walls, and the second buffer space is in one-to-one correspondence with each of the plurality of side walls;
the first buffer space and the second buffer space corresponding to each of the plurality of side walls are communicated to each other and together constitute a buffer receiving region; the at least one inner buffer sheet is provided in the buffer receiving region.

13. The backlight module according to claim 12, wherein the mold frame further includes at least one outer buffer sheet;
the at least one outer buffer sheet and the at least one inner buffer sheet are disposed on a same surface of the mold frame body;
the mold frame body, each of the at least one outer buffer sheet, and a corresponding one of the at least one inner buffer sheet together form a sidewall recessed gap having a recessed port; and at least one of the plurality of side walls is inserted into at least one side wall recessed gap through the recessed port in one-to-one correspondence.

14. The backlight module according to claim 1, wherein multiple layers of optical films are provided, and each of the multiple layers of optical films is provided with alignment mark holes; and orthographic projections of the alignment mark holes provided in each of the multiple layers of optical films on a plane of the bottom surface are independent of each other.

15. The backlight module according to claim 1, wherein the light guide plate is a side-type light guide plate, and the backlight module comprises a light-shielding region and a light-transmitting region; light guide plate dots are distributed in regions of the at least one light guide positioning portion corresponding to the light-transmitting region and the light-shielding region.

16. A display apparatus, comprising:
a display panel; and
the backlight module according to claim 1.

17. The display apparatus according to claim 16, wherein a mold frame in the backlight module further includes a protective cover; the protective cover is disposed on a surface of a mold frame body on which at least one inner buffer sheet is not formed, and the display panel is located in the protective cover.

* * * * *